UNITED STATES PATENT OFFICE.

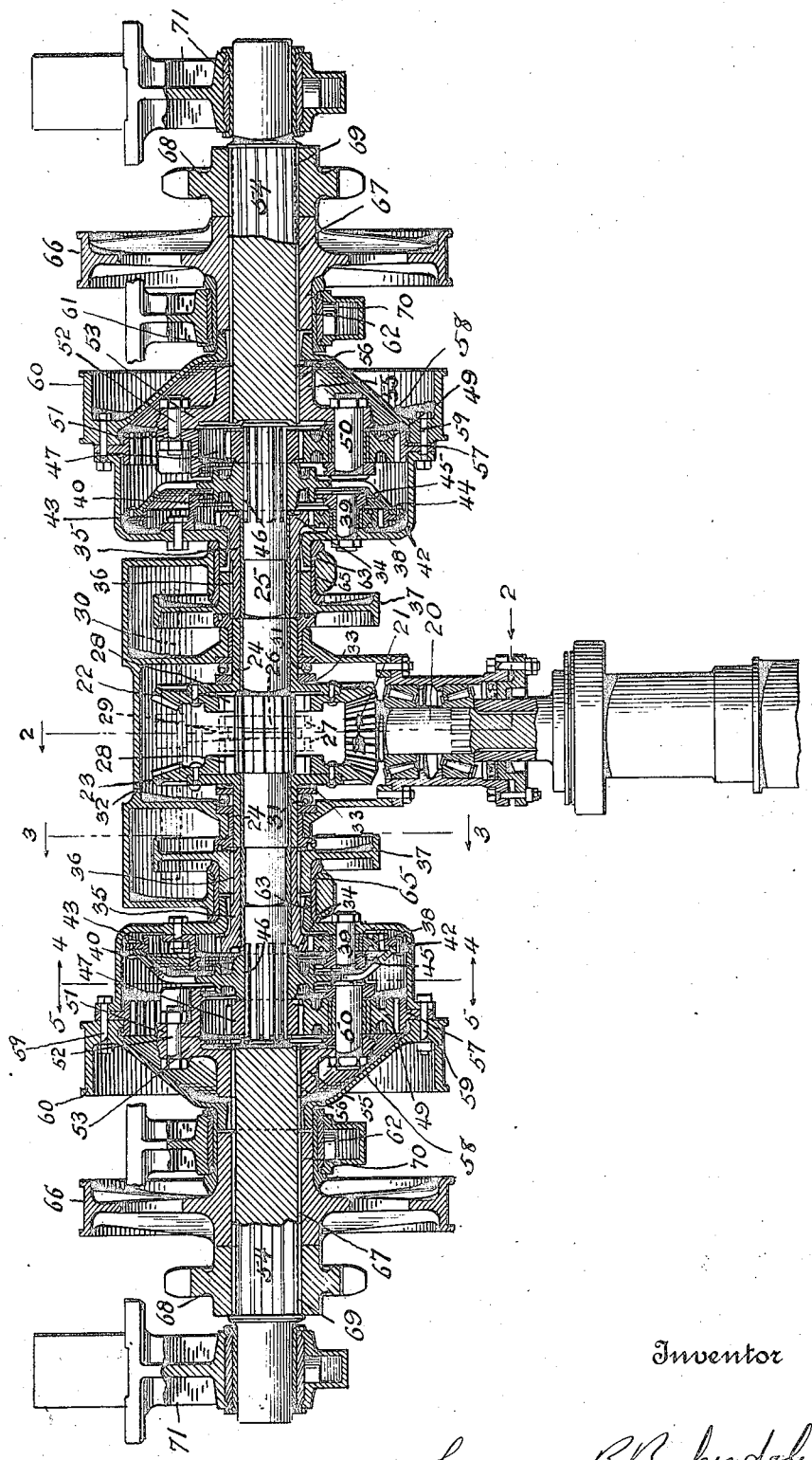

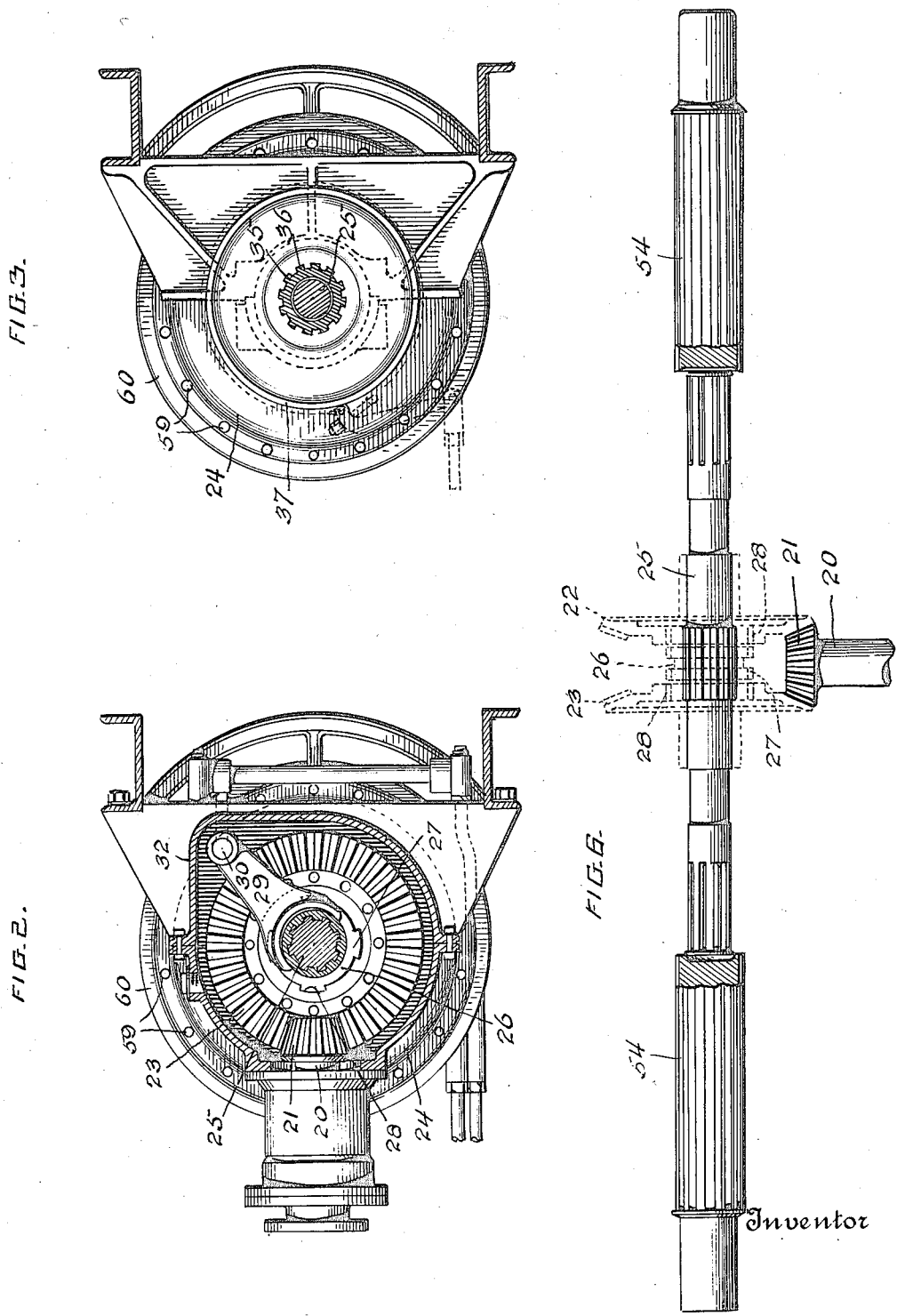

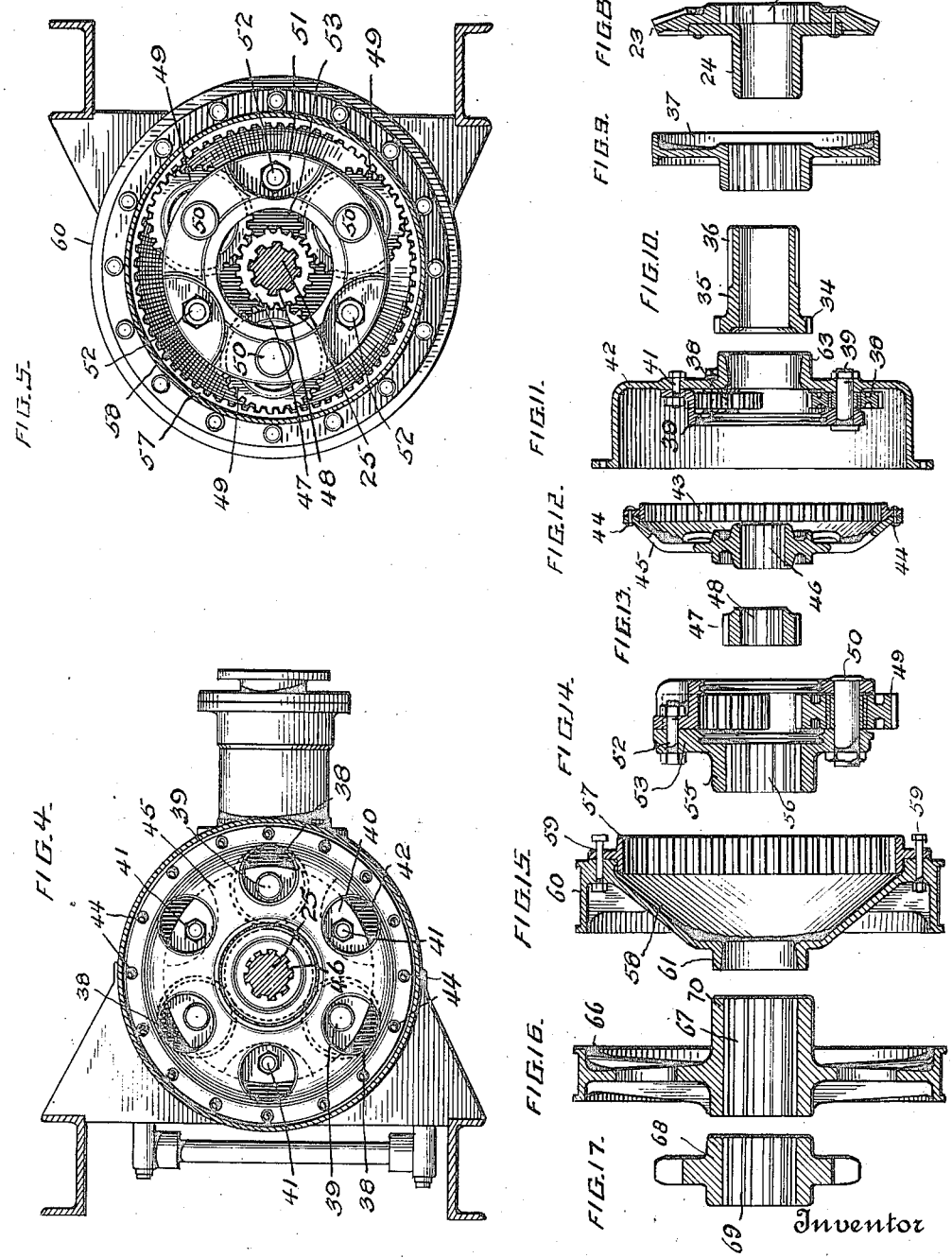

LAWRENCE R. BUCKENDALE, OF THE UNITED STATES ARMY, ASSIGNOR TO NEWTON D. BAKER, SECRETARY OF WAR, TRUSTEE.

EPICYCLIC-POWER TRANSMISSION.

1,424,446.        Specification of Letters Patent.     Patented Aug. 1, 1922.

Application filed October 14, 1919. Serial No. 330,675.

(FILED UNDER THE ACT OF MARCH 3, 1883, 22 STAT. L., 625.)

*To all whom it may concern:*

Be it known that I, LAWRENCE R. BUCKENDALE, captain, Ordnance Department, United States Army, a citizen of the United States, stationed at Detroit, Michigan, have invented an Improvement in Epicyclic-Power Transmissions, of which the following is a specification.

The invention described herein may be used by the Government, or any of its officers or employees in prosecution of work for the Government, or by any other person in the United States, without payment of any royalty thereon.

This invention relates to an improved epicyclic power transmission, especially adapted for use on tractors, tanks or other motor driven vehicles.

The object being to provide for the transfer of power, taken from a single source, through a plurality of transmission mechanisms entirely independent of each other, as for instance, the tracks of a tractor of the track laying type.

When used as above, power is required to be applied to the tracks at the same speed in the same direction, and at times, at different speeds in the same direction, or to either track, while the other is free, or to either chain while the other is held stationary, as this arrangement constitutes the steering mechanism of this type of tractor.

One embodiment of the above improvement is shown in the following drawings in which similar numerals indicate corresponding parts in all the figures:—

Fig. 1 is a horizontal section taken through the improved epicyclic transmission;

Fig. 2 is a transverse section taken on line 2—2 of Fig. 1;

Fig. 3 is a similar view taken on line 3—3 of Fig. 1;

Fig. 4 is a similar view taken on line 4—4 of Fig. 1;

Fig. 5 is a similar view on line 5—5 of Fig. 1;

Fig. 6 is a detail elevation of a portion of the drive or power shaft; the primary driven or cross shaft, and the secondary driven or sprocket shaft;

Fig. 7 is a detail sectional view of the clutch or reversing gear;

Fig. 8 is a detail sectional view of one of the bevel gears;

Fig. 9 is a detail sectional view of one of the high speed brake drums;

Fig. 10 is a detail sectional view of a high speed sun pinion and sleeve;

Fig. 11 is a detail sectional view of a portion of the epicyclic gear case, high speed planet pinion ring and one of the planet pinions;

Fig. 12 is a detail sectional view of a high speed orbit ring and gear;

Fig. 13 is a detail sectional view of a low speed sun gear;

Fig. 14 is a detail sectional view of a low speed planet pinion ring, planet pinion disk, and one of the planet pinions;

Fig. 15 is a detail sectional view of a portion of the epicyclic gear casing, low speed orbit gear and drum;

Fig. 16 is a detail sectional view of a secondary driven, or sprocket shaft, brake drum; and Fig. 17 is a detail sectional view of a sprocket gear.

Referring to the drawings by numerals, 20 indicates the power or drive shaft of an engine or other source of power, and mounted to rotate therewith is the bevel pinion 21, in permanent mesh with bevel gears 22 and 23. The bevel 23, when the drive shaft operates in the direction of the arrow, will be the forward and 22 the reverse gear.

The bevel gears 22 and 23 are secured to flanged sleeves 24—24 loosely mounted to rotate on a primary driven, or cross shaft 25.

A clutch member 26, splined to the cross shaft between the bevel gears 22 and 23, is provided with peripheral teeth 27, and is adapted to mesh with internal teeth 28 of one or the other of the bevel gears or be moved to a neutral position.

The bevel gears 22 and 23 are permanently in mesh with opposite sides of the power pinion 21 and operate necessarily in opposite directions and a clutch shifting fork 29 engaging in a groove in the clutch member 26 is mounted on slide rod 30, and may be operated selectively to cause the clutch to mesh with one or the other of the bevel gears 23 or 22 to impart a forward or reverse movement to the transmission mechanism or rest clear of both of said bevel gears when in its neutral position.

As will be seen from drawings the parts of the transmission on each side of the pinion 21 are duplicates, except that they are in rearward positions with respect to each other, and are identical in every way as to operation, and are adapted to transfer movement to the track (not shown), on the corresponding side of the vehicle.

Thrust bearings 31 are mounted in the bevel gear case 32, and shims 33 are inserted between said bearings and the bevel gears for the adjustment of the latter to maintain the proper meshing of the bevels 22 and 23 and pinion 21.

With the above arrangement of parts, power enters the transmission through the drive shaft and its pinion 21 and rotates the loosely mounted bevel gears 22 and 23 in opposite directions, therefore, by moving the clutch into contact with one or the other of the bevel gears, 22 or 23 the desired movement in either direction may be imparted to the primary driven or cross shaft 25 carrying the epicyclic transmission mechanism hereinafter described.

In describing the epicyclic transmission mechanism identical parts on either side of the pinion 21 will be designated by the same reference numerals.

The epicyclic transmission mechanism consists of the high speed sun pinion 34 loosely mounted on the shaft 25, said gear having a sleeve 35, on the outer face of which is keyed, as at 36, the high speed brake drum 37.

The high speed sun pinion 34 meshes with the planet pinions 38, operating on pins 39 mounted in the planet pinion ring 40, secured by bolts 41 to the inner face of one member of the epicyclic rotary gear case 42.

The high speed orbit gear 43 is mounted by bolts 44 on the orbit gear-ring 45 keyed or splined as at 46 on shaft 25.

With the parts as shown, when primary driven shaft 25 is rotated and the high-speed brake drum 37 is held stationary, by means of a brake band, or other suitable means, the high speed sun pinion 34 will also be held stationary and the orbit gear 43 which is keyed as at 46 to the shaft 25 will cause the planet pinions 38, to revolve about their sun pinion 34 and thereby cause the casing 42 to rotate.

Low speed sun pinion 47 is keyed or splined as at 48 on the outer end of the primary driven shaft 25, and is in mesh with low speed planet pinions 49, said planet pinions 49 being mounted on pins 50 in the planet ring 51, bolted at 52, to the planet pinion disk 53.

In axial alignment with the primary driven, or cross shaft 25 is a secondary driven, or sprocket shaft 54, and it is to said shaft 54 that the different speeds are imparted through the gears above mentioned.

The planet pinion disk 53 is provided with a sleeve 55, keyed as at 56 to the secondary driven shaft 54.

Low speed orbit gear 57 is mounted on the portion 58 of the epicyclic rotary gear case, and is secured by bolts 59 which connect the portions 42 and 58 of said gear case. The orbit gear 57 meshes with the low speed planet gears 49.

The portion 58 of the rotary gear case is provided with a brake drum 60, and an external bearing surface 61 mounted in the inner bearing 62 of the secondary driven shaft. A similar bearing surface 63 is provided on the portion 42 of the gear case which is mounted for rotation in bearing 65. The exterior bearing surfaces 63 and 61 are arranged on sleeves through which the high speed sun pinion sleeve 35 extends, on one side and the secondary driven shaft on the other and provides for a clearance between said parts.

A brake drum 66, is keyed as at 67 to the sprocket shaft 54, and a sprocket wheel 68 is also keyed at 69, on said secondary shaft. The brake drum 66 is provided with sleeve 70, mounted in bearing 62, and the outer end of the secondary driven shaft 54 is mounted in the outer bearing 71.

From the sprocket 68 a sprocket chain (not shown) may extend to impart movement to mechanism which moves the track. The bearing surfaces throughout the mechanism are properly bushed as shown.

As above stated movement in either direction is imparted to the primary driven shaft, and in high speed the drive progresses from the primary driven shaft to the orbit gear ring 45 and thence to the orbit gear. For high speed drive it will be understood that the braking mechanism is applied to drum 37 and released from drum 60. The orbit gear 43 meshes with the three high speed planetary pinions 38, causing them to rotate about their bearing pins 39 as an axis, and also to roll around the circumferences of the sun pinion 34 which pinion is locked, due to the stopping of the high speed drum 37. As the planet pinions 38 rotate about the circumference of sun pinion 34, they carry with them the rotary gear casing. The casing carries the epicyclic low speed orbit gear 57, which meshes with the low speed planet pinions 49. The rotation of the orbit gear causes the planet pinions 49 to roll around the sun pinion 47, which is also rotating, and as the planet pinions 49 roll around they carry with them, by means of the bearing pins 50, the disk 53, which communicates the drive to the secondary driven shaft 54 and thence to the sprocket 68.

On low gear the braking mechanism is applied to brake drum 60 while the high speed brake mechanism is released from drum 37. This condition of the brakes which controls the speeds permits of the following progress of the drive for low gear.

The bevel pinion 21 meshes with and drives the bevel gear 23 and by means of the clutch 26 drives the cross shaft 25. This carries with it idly, the parts 45, 43, 38, 34 and 37, all of these being free to revolve due to the release of the high speed brake drum 37. The bearing pin 50, however, is held from rotating due to the application of the low speed braking mechanism on drum 60. Thus the drive goes from the cross shaft 25 to the sun pinion 47, thence to the planet pinions 49 which rotate within the epicyclic orbit gear 57 now held stationary. As the planet pinions 49 travel around within the orbit gear 57 they carry the pins 50 and the planet pinion disk 53 by means of which the drive is communicated to the shaft 54 and thence to sprocket 68.

By placing the clutch member 26 in neutral or midway between and out of engagement with both bevel gears, 22—23 said bevels will operate idly in opposite directions on the primary driven shaft 25.

When the clutch is in engagement with one of the bevels, the shaft, 25, will rotate with said engaged bevel, in a corresponding direction.

When shaft 25 is rotated, and before any one of the brake drums is stopped, all the rotatable parts of the transmission operate with said shaft, except, secondary shaft 54, and sprocket 68, brake drum 66, planet pinion disk 53 and planet pinion ring 51, rigidly secured to said secondary shaft 54, and planet pinions 49 rotate on their pins 50. The planet pinions 38 also rotate on the pins 39 to allow for any difference in rotative speed between the gear 43 and housing 42. All parts with the exception of those above named simply idling with shaft 25, without transmitting power or rotation to the secondary shaft.

When, however, one of the drums 37 or 60 are held stationary, power is then transferred to shaft 54 and from thence to the load through the epicyclic gearing as above described.

With the above arrangement, power may be taken from a single shaft 25, and transferred to either one or both of the secondary shafts at variable speeds, said secondary shafts being, with their operating mechanism entirely independent of each other and depending for function on the application of braking means to the brake drums 37 and 60.

It is also possible to operate one secondary shaft and permit the other to run idly, or it may be locked stationary by stopping the brake drum 66 on which the track brake may be applied.

The above described transmission has special value as applied to tractors or tanks having tracks of the caterpillar type wherein the machine is steered by varying the operation of the tracks.

What I claim is:—

A power transmission having a drive shaft, a primary driven shaft and secondary driven shafts, means for driving the primary driven shaft in either direction, and plural epicyclic transmission mechanisms, one having its orbit gear mounted for rotation with the primary driven shaft, and the other having its sun pinion mounted for operation with the primary driven shaft, and brakes associated with said mechanism operable to hold parts of the mechanism stationary to transfer variable speeds from the primary to the secondary driven shaft.

LAWRENCE R. BUCKENDALE.